United States Patent Office 3,730,925
Patented May 1, 1973

3,730,925
PROCESS OF PRODUCING DEXTRIN ESTERS OF MALEIC ACID COPOLYMERS
Leslie P. Kovats, Granite City, Ill., assignor to Anheuser-Busch, Incorporated, St. Louis, Mo.
No Drawing. Filed Feb. 8, 1971, Ser. No. 113,666
Int. Cl. C08f 27/00, 27/12
U.S. Cl. 260—17.4 ST    5 Claims

ABSTRACT OF THE DISCLOSURE

A process is disclosed for dry reacting a starch dextrin with a maleic acid copolymer under controlled conditions to produce a dextrin ester of low degree of substitution in unswollen granule form. Specific copolymers suitable for use in this invention are a copolymer of methyl vinyl ether and maleic anhydride and a copolymer of ethylene and maleic anhydride. The dextrin has 0.5–5% moisture and the reaction is at a temperature of 100–135° C. for ½–3 hours. The amount of copolymer is 0.3–15%.

BACKGROUND OF THE INVENTION

It is known to make an adhesive by mixing an aqueous dextrin solution, a hydrolyzed interpolymer of a vinyl alkyl ether and maleic anhydride, and a phenol substituted with 1 to 3 dialkylamino alkyl groups. These products are described in U.S. Pat. No. 3,366,587. However, the present invention provides a convenient method of making a dry product which can be mixed at the customer's plant without storing a large number of ingredients. The dry reaction of this invention can be carried out in a conventional dextrin roaster which normally is available in starch processing plants, and results in a low degree of solubility (D.S.) dextrin esters in unswollen granule form.

Accordingly, this invention relates to a process of producing dextrin esters of maleic acid copolymers. More particularly the present invention relates to the preparation of low D.S. dextrin esters in unswollen granule form, which process comprises heating dextrin in the presence of maleic anhydride resins, such as the copolymer of methyl vinyl ether and maleic anhydride, or the copolymer of ethylene and maleic anhydride.

The process more specifically comprises heating a dextrin containing about 2% moisture with the maleic anhydride resin at a temperature of about 100° C. for approximately 1½ hours and recovering the resulting esterified product.

It is an object of this invention to provide an economically feasible process whereby improved dextrin esters may be prepared. Another object of this invention is to provide improved dextrin ester based adhesive compositions characterized by exceptional improvement in such properties as adhesion bond strength, quick tack, coating ability and film forming.

I have found that the reaction of maleic anhydride resin with dextrin can be directed to afford a low D.S. dextrin ester. The moisture content of the reaction mixture composed of dextrin and maleic anhydride resin should be within the range of 0.5% to about 5%, the reaction temperature should be about 100° C. to about 135° C., and the reaction time should be about 30 minutes to about three hours.

The esterification reaction between the dextrin and the maleic anhydride resin is preferably carried out at an elevated temperature, e.g. 120° C. When a higher reaction temperature is used it is necessary to adjust (shorten) the reaction time in order to avoid decomposition of the product. The amount of maleic anhydride resin may vary widely depending upon the degree of substitution and the properties desired. The amount of the maleic anhydride resin should be within the range of about 0.3 to about 15% by weight, based on the weight of dextrin. It is desirable to have the starting materials (dextrin and maleic anhydride derivative) blended prior to the heating process.

The dextrin and maleic anhydride derivative have a particle size of about 40 mesh to about 60 mesh prior to reaction. The dextrin has a degree of fluidity of about 25 to about 95. The product of the reaction has a degree of substitution of about 0.004 to about 0.019.

The moisture content of the reaction mixture is maintained between about 0.5 and about 5% by removing excess water formed in the reaction by any conventional means, such as a heated air stream. The moisture of the final product is about 0.5 to about 5%.

The maleic anhydride resin has a molecular weight of about 1500 to about 90,000.

Numerous maleic anhydride copolymers are available in commercial quantities. "EMA" is Monsanto's trademark for a series of water-soluble ethylene-maleic anhydride copolymers. These maleic anhydride copolymer resins are available in a wide range of molecular weights and in linear or branched structures. The structure of "EMA" copolymer is as follows:

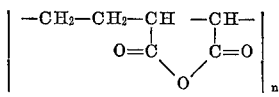

wherein $n$ is an integer of from about 11 to about 700.

"EMA" resins can be reacted with polyhydroxy compounds such as dextrin to produce the corresponding half-esters. The reaction is accelerated by heat and acid catalyst and may be carried to the point of formation of a cross-linked product. The reaction can be presented by the following equation:

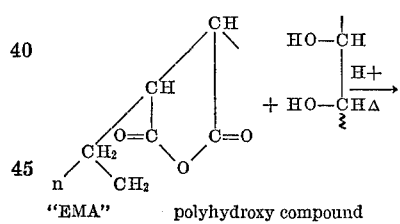

"EMA"    polyhydroxy compound

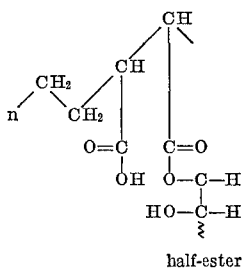

half-ester

"Gantrez AN" is General Aniline and Film Corporation's trademark for a series of linear methyl vinyl ether maleic anhydride copolymers. These maleic anhydride copolymer resins are also available in several molecular weight ranges. Structure of "Gantrez AN" copolymer is as follows:

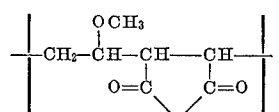

where $n$ is an integer from about 11 to about 700.

"Gantrez AN" resins can be also reacted with white dextrins, yellow dextrins or other similar type starch hydrolyzates to produce half ester products. The esterification reaction can be presented by the following equation:

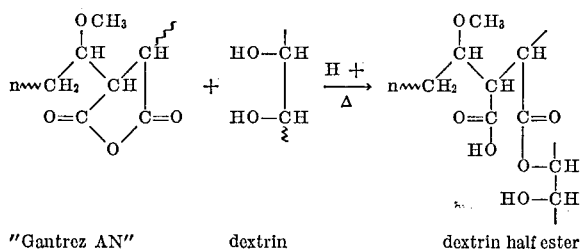

"Gantrez AN"    dextrin    dextrin half ester

"Gantrez AN" resin crosslinks by means of primary valence bonds with dextrins. The degree of substitution in the product can be determined by saponification of the sample with 0.5 N sodium hydroxide solution in pyridine. The low D.S. dextrin esters contained approximately 1 ester group per 50 anhydro glucose unit (AGU) as the half ester. The dextrin esters can be used for the preparation of adhesives. The dextrin ester adhesive compositions of the present invention can be further modified to advantage by the addition of various other ingredients conventionally employed in the industry. Dextrin ester and urea combinations yielded excellent paper laminating adhesives. The adhesives made from the dextrin ester derivatives are superior to the adhesives made from regular dextrins. In most cases a strong bond was formed in aluminum foil and paper laminations. The adhesives made from the "Gantrex AN" dextrin derivative had also excellent film forming properties on glass. Similar adhesive compositions can also be applied as a re-moistenable coating for paper tapes. The dextrin ester compositions can be used to form a protective coating on several materials and this can easily be removed with warm water.

The following examples will further illustrate the embodiments of the invention.

Example I 10 lbs. of white dextrin (2% moisture content) was blended with 136 g. of copolymer of methyl vinyl ether and maleic anhydride (Gantrez AN 119 having a specific viscosity of 0.1–0.5 measured on a 1% solution of the copolymer in methyl ethyl ketone at 25° C.), then heated in a dextrin roaster for 1 hour and 30 minutes at 220° F. and recovered the product. The adhesives made from this low D.S. dextrin ester have shown excellent adhesion to various paper substrates. A case seal type adhesive was formulated from dextrin ester, urea, borax and water.

Formula:
  250 g. of dextrin ester
  315 g. of water
  10 g. of urea
  1.0 g. of borax
  1.5 g. of (50%) aqueous sodium hydroxide Example II 10 lbs. of yellow dextrin (1.5% moisture content) was blended with 200 g. of copolymer of methyl vinyl ether and maleic anhydride (Gantrez AN 139 medium molecular weight compound having a specific viscosity of 1.0–1.4 measured on a 1% solution of the copolymer in methyl ethyl ketone at 25° C.), then heated in a dextrin roaster for 1 hour and 30 minutes at 232° F. and recovered the product. The adhesives formulated from this product are recommended for case seal type applications.

Example III 10 lbs. of white dextrin (2% moisture content) was blended with 140 g. of copolymer of methyl vinyl ether and maleic anhydride (Gantrez AN 169 high molecular weight compound having a specific viscosity of 2.6–3.5 measured on a 1% solution of the copolymer in ethyl ketone at 25° C.) then heated in the dextrin roaster for 1 hour and 35 minutes at 216° F. and recovered the esterified dextrin. The adhesive prepared from this product was promising in aluminum foil—paper laminations and case seal applications. The product could be also used to prepare protective surface coating films on glass or on other similar materials. The formula was made from the product, dicyandiamine borax and water.

Formula:
  250 g. of dextrin ester
  320 g. of water
  12.1 g. of dicyandiamine
  1.0 g. of borax (10 $H_2O$)
  2.5 g. of butyl-benzyl-phthalate The adhesive forms a tough clear film on glass when dried. 100% fiber tear was observed in paper laminations when this adhesive was used. The product (dextrin ester) was also incorporated into polyvinyl acetate emulsion polymer adhesives. A commercially available polyvinyl acetate emulsion polymer (Elvacet 1454) was blended with a 50% aqueous dextrin ester solution as follows.

Adhesive blend:
  200 ml. of Elvacet 1454
  100 ml. of 50% aqueous dextrin ester solutions (cooked dextrin-Gantrez 169 aqueous solution)
  15 ml. of benzoflex 9–88

The dextrin ester water solution was compatible with the polyvinyl acetate emulsion polymer. The adhesive blend had about 25 sec. set time on light kraft paper and 100% fiber tear.

Example IV 10 lbs. of yellow dextrin (2% moisture content) was blended with 142 g. of ethylene maleic anhydride resin (EMA–11 linear copolymer of ethylene and maleic anhydride having a molecular weight of 1500–2000) then heated in the roaster for 1 hour and 20 minutes at 270° F. and recovered the esterified product. The adhesive made from this product was promising in paper laminations.

Formula:
  270 g. of dextrin derivative
  250 g. of water
  15 g. of borax (10 $H_2O$)
  2.3 g. of 50% aqueous sodium hydroxide solution Example V The procedure was the same as in Example IV except EMA–31 ethylene maleic anhydride copolymer having a molecular weight of 75,000–90,000 was used in place of EMA–11.

What is claimed is:

1. A process of making starch dextrin esters consisting essentially of the steps of heating a mixture of starch dextrin and about 0.3 to about 15%, by weight based on the weight of the starch, of a copolymer selected from the group consisting of copolymer of ethylene and maleic anhydride and copolymer of methyl vinyl ether and maleic anhydride in the presence of about 0.5 to about 5% moisture by weight based on the weight of the reactants, and at a temperature of about 100 to about 135° C., and continuing the heating for a time sufficient to produce a starch dextrin ester of about 0.004 to about 0.19 degree of substitution.

2. The process of claim 1 wherein the starch dextrin is of 25 to 95 degree fluidity.

3. The process of claim 1 wherein the time of reaction is about three minutes to about three hours.

4. The process of claim 1 wherein the reactants have a mesh size of about 40 to about 80.

5. The process of claim 1 wherein the copolymer has a starting moisture content of about 0.5 to about 5%.

References Cited

UNITED STATES PATENTS

| 3,366,587 | 1/1968 | Uffner | 260—17.4 |
| 3,133,890 | 5/1964 | Britton | 260—17.4 |

FOREIGN PATENTS

| 232,311 | 1/1959 | Australia | 260—17.4 |

WILLIAM H. SHORT, Primary Examiner

L. L. LEE, Assistant Examiner

U.S. Cl. X.R.

260—233.5